United States Patent [19]
Matsuura et al.

[11] Patent Number: 5,862,282
[45] Date of Patent: Jan. 19, 1999

[54] OPTICAL CONNECTOR PLUG AND OPTICAL CONNECTOR

[75] Inventors: Ichiro Matsuura; Tomohiko Ueda; Toru Yamanishi, all of Yokohama; Shinji Nagasawa, Mito, all of Japan

[73] Assignees: Sumitomo Electric Industries, Ltd., Osaka; Nippon Telegraph and Telephone Corp., Tokyo, both of Japan

[21] Appl. No.: 809,744
[22] PCT Filed: Jul. 11, 1996
[86] PCT No.: PCT/JP96/01922
  § 371 Date: Jun. 17, 1997
  § 102(e) Date: Jun. 17, 1997
[87] PCT Pub. No.: WO97/03374
  PCT Pub. Date: Jan. 30, 1997

[30] Foreign Application Priority Data

Jul. 12, 1995 [JP] Japan ................................. 7-176208

[51] Int. Cl.⁶ ........................................................ G02B 6/36
[52] U.S. Cl. .............................. 385/86; 385/60; 385/68; 385/78; 385/84
[58] Field of Search ................................. 385/86, 60, 55, 385/56, 58, 66, 68, 70, 72, 76, 77, 78, 84

[56] References Cited

U.S. PATENT DOCUMENTS

| | | | |
|---|---|---|---|
| 5,170,452 | 12/1992 | Ott | 385/60 |
| 5,231,685 | 7/1993 | Hanzawa et al. | 385/84 |
| 5,719,977 | 2/1998 | Lampert et al. | 385/60 |

FOREIGN PATENT DOCUMENTS

| | | |
|---|---|---|
| 0 118 804 | 9/1984 | European Pat. Off. |
| 56-93510 | 7/1981 | Japan . |
| 57-30714 | 2/1982 | Japan . |
| 63-179304 | 7/1988 | Japan . |
| 63-173209 | 11/1988 | Japan . |
| 64-13013 | 1/1989 | Japan . |
| 64-63910 | 3/1989 | Japan . |
| 2 136 595 | 9/1984 | United Kingdom . |

*Primary Examiner*—Phan T. H. Palmer
*Attorney, Agent, or Firm*—Pillsbury Madison & Sutro LLP

[57] ABSTRACT

An optical connector that can stably connect even a tension-resistant jacket-covered optical fiber cord is provided. In an optical connector, which includes an optical connector plug 10 having a ferrule 14 holding an optical fiber and a housing 16 accommodating the ferrule, and an adapter connecting the optical connector plugs; the optical fiber is an optical fiber cord 12 in which at least the jacket carries tension, a secondary coated optical fiber (120) and the jacket (123) carrying the tension of the optical fiber cord 12 are secured to the ferrule 14, and the ferrule 14 is immovably mounted to the housing 16.

8 Claims, 8 Drawing Sheets

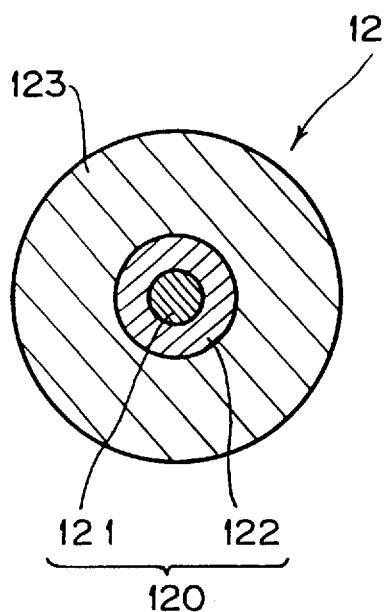
F I G . 2

OPTICAL CONNECTOR PLUG AND OPTICAL CONNECTOR

This application is the national phase of international application PCT/JP96/01922, filed Jul. 11, 1996 which designated the U.S.

1. Technical Field

The present invention relates to an optical connector for connecting optical fibers, and more particularly to a plug-adapter-plug type optical connector for connecting plugs through an adapter and also to an optical connector plug thereof.

2. Background Art

Among the known conventional plug-adapter-plug type optical connectors are an FC connector of JIS C 5970 F01 type, an SC connector of JIS C 5973 F01, and an MPO connector disclosed in Japanese Utility Model Publication No. 4-49606 and Japanese Patent Application laid-Open No. 4-347806.

Because these optical connectors are assumed to be connected and disconnected frequently, they are required to have a function to position an optical fiber with high precision and a function to maintain the close junction between optical fibers. To maintain the close junction between optical fibers, a ferrule in a housing of each connector plug is made axially movable and is biassed from the rear by a coil spring. When the connector plugs are coupled, the ferrule is moved rearwardly against a biassing force to produce a predetermined pressing force. The optical fiber cord used on this connector is a so-called tension-resistant fiber-covered optical fiber cord, which, as shown in FIG. 4, includes: a secondary coated optical fiber made up of a primary coated optical fiber (a bare optical fiber) covered with an optical fiber jacket of resin; a tension-resistant fiber enclosing the secondary coated optical fiber; and an optical cord jacket enclosing all these.

The end of the tension-resistant fiber is secured to the housing to prevent the secondary coated optical fiber from being tensed.

In recent years, the conventional tension-resistant fiber-covered optical fiber cords are being increasingly replaced with a new type of optical fiber cord (hereinafter referred to as a tension-resistant jacket-covered optical fiber cord) in which, as shown in FIG. 2, an optical cord jacket is directly fitted substantially tightly over the secondary coated optical fiber and is provided with a tension resisting capability.

When such a tension-resistant jacket-covered optical fiber cord is applied to the conventional optical connector plug, however, the optical cord jacket is directly fixed to the ferrule and also to the housing. This gives rise to the problem of retraction of the ferrule at the time of connector coupling which results in the optical fiber being bent locally with a small radius of curvature, leading to increased losses and deteriorated reliability. Possible means to avoid this problem may include not fixing the optical cord jacket to the housing. But this will further retract the ferrule when the optical fiber cord is subjected to tension, rendering the joint unstable and, in the worst case, dislodging the fibers out of joint, which in turn results in an increase in connection losses and reflected light.

A primary object of this invention is to solve the aforementioned problems experienced with the prior art and to provide an optical connector plug and an optical connector that can stably couple even a tension-resistant jacket-covered optical fiber cord.

DISCLOSURE OF THE INVENTION

To accomplish the object, in a first aspect of the present invention, there is provided an optical connector plug comprising:

a ferrule fixed to an end of an optical fiber cord which has a secondary coated optical fiber and a tension-resistant jacket covering the secondary coated optical fiber;

a housing accommodating the ferrule; and wherein the secondary coated optical fiber and the tension-resistant jacket of the optical fiber cord are secured to the ferrule and the ferrule is axially immovably mounted to the housing.

Here, the housing may comprise a plug frame, a stop sleeve and an elastic hood.

Further, the tension-resistant jacket of the optical fiber cord may be bonded to a rear end portion of the elastic hood of the housing.

On the other hand, the housing may be integrally formed with an adapter to which a mating optical connector plug to be connected are inserted.

In another aspect of the present invention, there is provided an optical connector comprising:

an optical connector plug comprising:

a ferrule fixed to an end of an optical fiber cord which has a secondary coated optical fiber and a tension-resistant jacket covering the secondary coated optical fiber;

a housing accommodating the ferrule; and wherein the secondary coated optical fiber and the tension-resistant jacket of the optical fiber cord are secured to the ferrule and the ferrule is axially immovably mounted to the housing; and a connecting adapter which mutually connects a pair of the optical connector plugs.

Here, the connecting adapter may comprise means for axially biassing the pair of optical connector plugs so as to connect to each other.

In still another aspect of the present invention, there is provided an optical connector plug comprising:

a ferrule fixed to an end of an optical fiber cord which has a secondary coated optical fiber and a tension-resistant jacket covering the secondary coated optical fiber;

a housing accommodating the ferrule; and wherein said secondary coated optical fiber and said tension-resistant jacket of the optical fiber cord are secured to said ferrule; and said ferrule is axially immovably mounted to said housing;

an optical connector plug comprising:

a ferrule fixed to an end of an optical fiber cord which has a secondary coated optical fiber and a tension-resistant jacket covering the secondary coated optical fiber;

a housing accommodating the ferrule; and wherein said secondary coated optical fiber and said tension-resistant jacket of the optical fiber cord are secured to said ferrule; and said ferrule is axially movably mounted to said housing; and a connecting adapter which mutually connects both said optical connector plugs.

Here, a refraction index matching agent may be coated on a connecting surface of the optical connector plugs to be mutually connected.

According to the invention, in an optical connector, which includes an optical connector plug having a ferrule holding an optical fiber and a housing accommodating the ferrule, and an adapter connecting the optical connector plugs, an optical fiber cord has a construction wherein at least a jacket carries tension, a secondary coated optical fiber of the optical fiber cord and the jacket carrying the tension are secured to the ferrule, and the ferrule is immovably mounted to the housing. This construction prevents local bending of the secondary coated optical fiber at the time of coupling and disconnection when the optical fiber cord is subjected to tension

BRIEF DESCRIPTION OF THE DRAWINGS

FIG. 2 is a cross sectional view showing an example of an optical fiber cord used in an optical connector of the invention whose jacket carries tension;

BEST MODE FOR CARRYING OUT THE INVENTION

The present invention will be described in detail in conjunction with preferred embodiments illustrated in the accompanying drawings.

Figure 1:
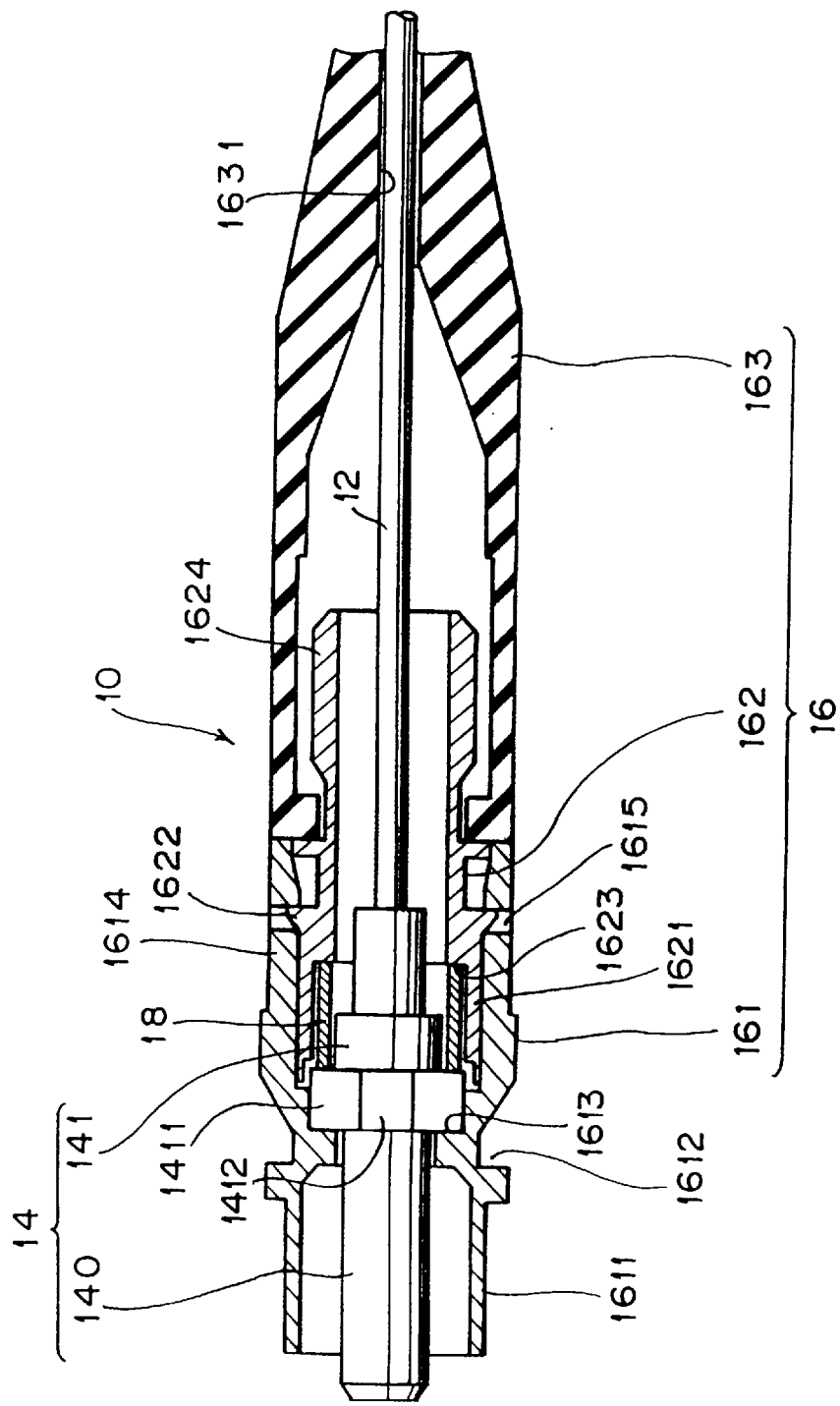
FIG. 1 is a cross sectional view showing an embodiment of the invention.

FIG. 1 shows an embodiment of an optical connector plug 10 according to the invention which comprises a ferrule 14 and a housing 16 which houses and holds the ferrule.

Figure 5:
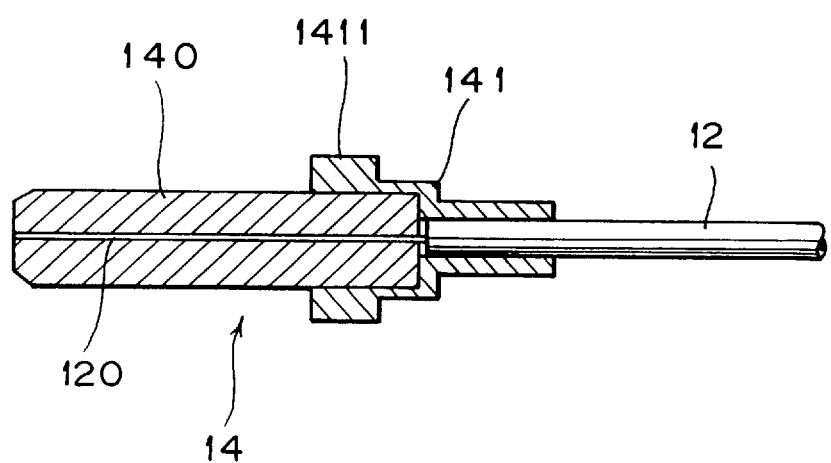
FIG. 5 is a cross sectional view showing a state in which an optical fiber cord is fixed to a ferrule.

In FIG. 1, designated 12 is an optical fiber cord that has a cross sectional structure shown in FIG. 2. This is a tension-resistant jacket-covered optical fiber cord, which includes: a secondary coated optical fiber 120 consisting of a primary-coated (bare) optical fiber 121 covered with an optical fiber jacket 122 of resin; and an optical cord jacket 123 directly fitted substantially tightly over the secondary coated optical fiber 120 and provided with a capability to carry tension. The end of the optical fiber cord 12 is secured to the ferrule 14 such that the secondary coated optical fiber 120 stripped of the optical cord jacket 123 is exposed at the front end surface of the ferrule 14, as particularly shown in FIG. 5. At the same time, the jacket 123 is also adhesively fixed to the rear end of the ferrule 14. The ferrule 14 has an elongated cylindrical body 140 and a cap member 141, fitted to the body 140, forming a disk-shaped flange 1411 at the middle of the ferrule 14. A positioning notch 1412 is formed on the disk-shaped flange 1411 (see FIG. 1).

In the shown case, the optical cord jacket 123 is stripped at its distal end, however it should be appreciated that the optical fiber cord 12 can be exposed at the front end surface of the ferrule 14 without the optical cord jacket 123 being striped. Further, the disc-like flange 1411 is not necessary to be cylindrical and may be non-cylindrical.

Referring again to FIG. 1, the housing 16 in this embodiment comprises a plug frame 161, a stop sleeve 162, and a resilient hood, for example, a rubber hood 163.

The plug frame 161 has a guide cylinder portion 1611 at the front end, an annular locking notch 1612 for engagement with the adapter etc. on the outer circumference, a stepped portion 1613 on the inner circumference to receive the disk-shaped flange 1411 of the ferrule 14, and a guide cylinder portion 1614 at the rear end. The rear guide cylinder portion 1614 has locking holes 1615 180 degrees apart.

The stop sleeve 162 comprises a guide cylinder portion 1621 fitted into the rear guide cylinder portion 1614 of the plug frame 161, projections 1622 formed on the outer circumference and engaged in the locking holes 1615, a stepped portion 1623 formed on the inner circumference, and a restriction cylinder 1624 at the rear end.

Denoted 18 is a cylindrical spacer which is disposed between the stepped portion 1623 of the stop sleeve 162 and the flange 1411 of the ferrule 14 so as to immovably fix the ferrule 14 in the housing 16. However, it may be possible to omit the spacer 18 by forming the stepped portion 1623 up to the position corresponding to the length of the spacer 18 at the time of molding the stop sleeve 162, and abutting thus formed stepped portion directly against the flange 1411 of the ferrule 14. In other words, the stop sleeve 162 and the spacer 18 may be integrally molded.

With the structure set forth above, the ferrule 14 to which the optical fiber cord 12 is secured is inserted into the plug frame 161, with the flange 1411 of the ferrule 14 being positioned by the notch 1412 and seated on the stepped portion 1613. Then, the stop sleeve 162, together with the spacer 18, is inserted into the plug frame 161 to fit its guide cylinder portion 1621 into the rear guide cylinder portion 1614 of the plug frame 161 until the projections 1622 engage in the locking holes 1615. This causes the flange 1411 to be clamped between the stepped portion 1613 of the plug frame 161 and one end of the spacer 18 whose other end engages the stepped portion 1623 of the stop sleeve 162, with the result that the ferrule 14 is held axially immovable by the plug frame 161 and the stop sleeve 162.

Further, the front end of the rubber hood 163 is adhesively bonded to the rear end of the plug frame 161. The optical fiber cord 12 extends outside through an insertion hole 1631 in the rubber hood 163. In this manner, the ferrule 14 having the optical fiber cord 12 fixed thereto is secured to the housing 16 so that it cannot be moved in the direction of the optical axis of the fiber. As a result, the optical fiber cord 12 is directly fixed to the housing 16 Further, any effects to connected portions caused by torsion of the optical fiber cord 12 can be eliminated by adhesively bonding the optical fiber cord 12 to the rubber hood 163 in the insertion hole 1631.

Figure 3:
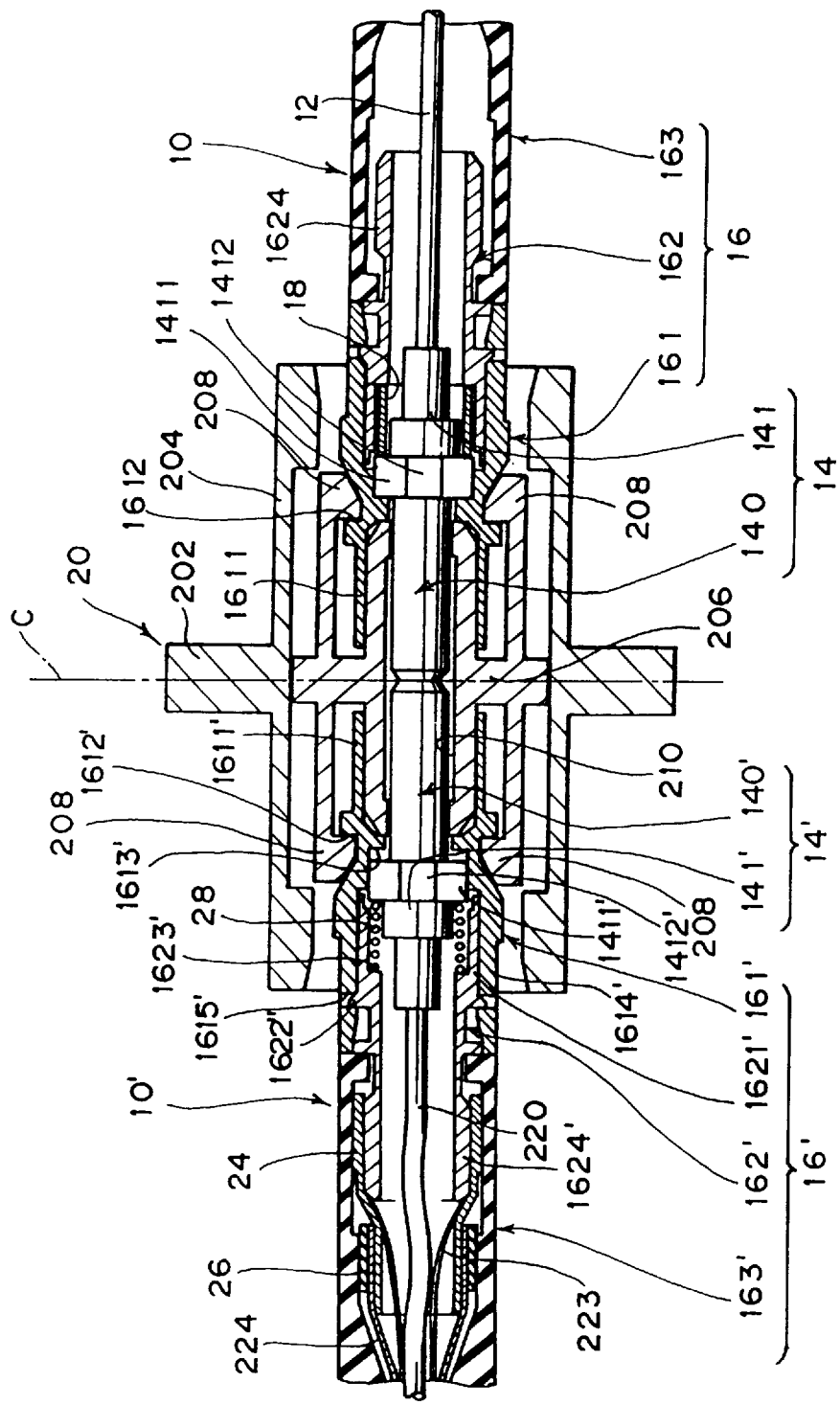
FIG. 3 is a cross sectional view showing an optical connector of the invention in a coupled state.

The above-mentioned optical connector plug 10 of this invention, used in combination with an adapter 20 of FIG. 3, constitutes an optical connector.

When the optical connector plug 10 of this invention in which the ferrule is axially immovable with respect to the housing is used, although the same type of the optical connector plug 10 may be used in pair as in the case of FIG. 7 described later, it is preferred that the mating optical connector plug 10' be of a type that, when pushed, allows the ferrule 14' to be moved axially. Now, we will explain about the mating optical connector plug 10'. The members whose constructions are identical with those of the optical connector plug 10 are assigned like reference numerals but with a prime"'" and repetitive descriptions are not given.

Figure 4:
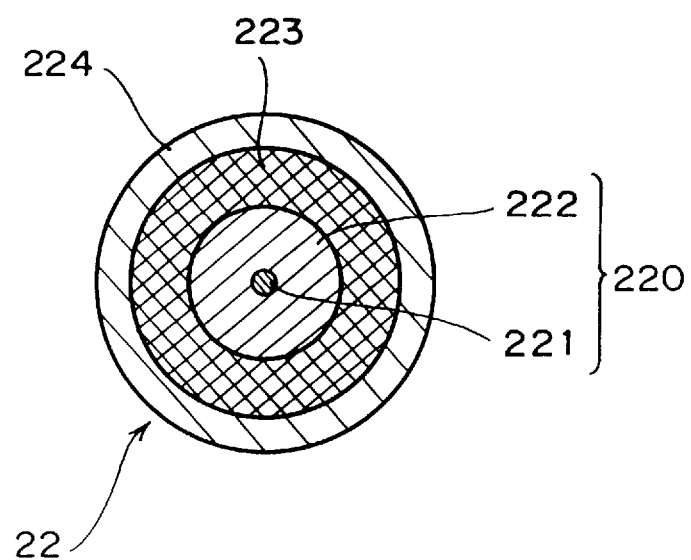
FIG. 4 is a cross sectional view showing an example of an optical fiber cord having a tension-resistant fiber.

The optical fiber cord 22 used in the optical connector plug 10' is a so-called tension-resistant fiber-covered optical fiber cord, which, as shown in FIG. 4, comprises: a secondary coated optical fiber 220 made up of a primary coated optical fiber 221 and an optical fiber jacket 222 of resin covering the primary coated optical fiber 221; a tension-resistant fiber 223 enclosing the secondary coated optical 220; and an optical cord jacket 224 enclosing these.

The secondary coated optical fiber 220 of the optical fiber cord 22 is secured at one end to the ferrule 14', with the secondary coated optical fiber 220 stripped of the optical cord jacket 224 and tension-resistant fiber 223 and exposed at the front end surface of the ferrule 14'. The tension-resistant fiber 223 is caulked and secured to a restriction cylinder 1624' of a stop sleeve 162' by a first retainer tube 24 and the optical cord jacket 224 is caulked and secured to the rear small-diameter portion of the first retainer tube 24 by a second retainer tube 26, resulting in both being secured to the housing 16'.

The ferrule 14' has a cylindrical body 140' and a cap member 141' as well as a cylindrical or non-cylindrical disk-shaped flange 1411' as set forth above at the intermediate portion, which has a positioning notch 1412'.

A housing 16' comprises a plug frame 161', a stop sleeve 162' and a rubber hood 163'.

The plug frame 161' has a guide cylinder portion 1611' at the front end, an annular locking notch 1612' on the outer circumference, a stepped portion 1613' on the inner circumference to accommodate and hold the disk-shaped flange 1411' of the ferrule 14', and a guide cylinder portion 1614' at the rear end. The guide cylinder portion 1614' is formed with locking holes 1615' 180 degrees apart from each other.

The stop sleeve 162' comprises a guide cylinder portion 1621' fitted into the rear guide cylinder portion 1614' of the plug frame 161', projections 1622' formed on the outer circumference and engaged in the locking holes 1615', a stepped portion 1623' formed on the inner circumference, and a restriction cylinder 1624' at the rear end.

Designated 28 is a coil spring, which is disposed between the flange 1411' of the ferrule 14' and the stepped portion 1623' of the stop sleeve 162'. The ferrule 14' is movably biassed by this spring 28 so as to allow the flange 1411' to abut against the stepped portion 1613' of the plug frame 161'.

The front end of the rubber hood 163' is adhesively bonded to the rear end of the plug frame 161'. As previously discussed in the optical connector plug 10', the ferrule 14' having the secondary coated optical fiber 220 fixed thereto is movably mounted in the housing 16', with the end of the tension-resistant fiber 223 secured to the housing 16' so that tension is not applied to the secondary coated optical fiber 220.

Optical connection is made by inserting such optical connector plugs 10 and 10' from opposite sides of the connecting adapter 20.

The connecting adapter 20 is formed, for example as shown in FIG. 3, symmetrical with respect to the center plane C and accommodates a sleeve holder 206 inside a cylindrical housing 204 formed with a support portion 202 which serves as a mount portion on a panel and the like or a knob. The sleeve holder 206 has a pair of left and right radially resilient locking claws 208 formed integral therewith and holds a cylindrical elastic sleeve 210 concentric with the cylindrical housing 204.

When the optical connector plug 10 is inserted from one end of the connecting adapter 20, the front end of the ferrule 14 is inserted into the elastic sleeve 210 with the guide cylinder portion 1611 guided along the outer circumference of the elastic sleeve 210 until the locking claws 208 engage with the annular locking notch 1612, at which time the optical connector plug 10 is held in position. The dimensions of these members are so set that, with the optical connector plug 10 held in place, the front end surface of the ferrule 14 is flush with the center plane C of the adapter 20.

Next, as the optical connector plug 10' is inserted from the other end of the connecting adapter 20, the front end of the ferrule 14' is inserted into the elastic sleeve 210 with the guide cylinder portion 1611' guided along the outer circumference of the elastic sleeve 210 until the locking claws 208 engage with the annular locking notch 1612'. As a result, the optical connector plug 10' is held in position. At this time the front end surface of the ferrule 14' comes in contact with the front end surface of the ferrule 14 and then deflects the spring 28. In this way, the biassing force of the spring 28 of the optical connector plug 10' gives a closely connected condition between ferrules 14 and 14' and prevents connection losses in optical connection from increasing.

The connecting adapter 20 may be formed integral with either of the plug frames 161 and 161', which makes up a part of the housing 16 or 16' of the optical connector plug 10 or 10'. In this case, the mating optical connector plug is inserted into the adapter 20 thus formed integral with the optical connector plug. Here, the term "to form integral" means to include both "to form the plug frame and the adapter by integrally molding them" and "to form the plug frame and the adapter separately and then integrate them by bonding". This simplifies the coupling procedure.

Here, another embodiment of the connecting adapter will be discussed referring to FIG. 7. The members whose constructions are identical with those of the connecting adapter 20 set forth above are assigned like reference numerals but with a prime "'" to simplify the discussion.

Figure 7:
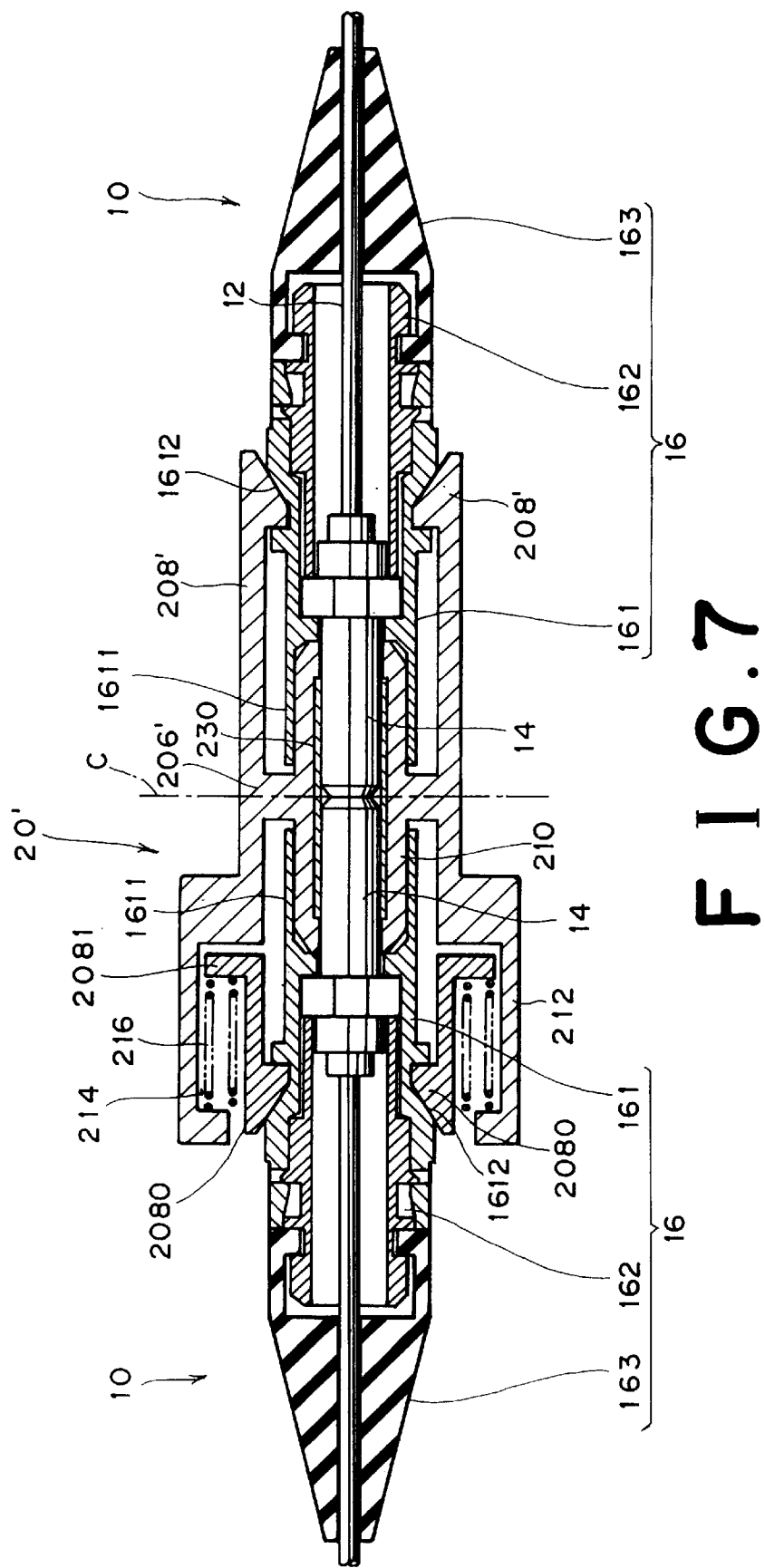
FIG. 7 is a cross sectional view showing an example of a connecting adapter used for an optical connector of the invention and a coupled state thereof.

The connecting adapter 20' shown in FIG. 7 is constructed such that a biassing force can be applied axially in either of directions to ensure the mutual connection of the optical connector plugs to be connected. To this end, the connecting adapter 20' in this embodiment comprises an enlarged sleeve 212 which is radially enlarged to define a cylindrical space 214 inside a portion on the left side with respect to the center plane C in FIG. 7 in comparison with the sleeve holder 206 set force above. Further, locking claws 2080 which are connected to each other by a flange 2081 are axially movably provided within the cylindrical space 214. The locking claws 2080 are axially biassed by a spring 216 at the flange 2081 in the right direction as illustrated.

With the connecting adapter 20' as constructed above, when the optical connector plug 10 is inserted from one end, on the left side, of the adapter, the front end of the ferrule 14 is inserted into the elastic sleeve 210' with the guide cylinder 1611 guided along the outer circumference of the elastic sleeve 210, and then the locking claws 2080 engage with the locking notch 1612, resulting in the optical connector plug 10 is held in a first predetermined position where the front surface of the ferrule 14 slightly projects from the center plane C of the connecting adapter 20'. Next, as the same type of optical connector plug 10 is inserted from the other end, on the right side, of the connecting adapter 20' in a like manner, the front end of the ferrule 14 is inserted into the elastic sleeve 210' with the guide cylinder 1611 guided along the outer circumference of the elastic sleeve 210', and then the locking claws 208' engage the locking notch 1612, resulting in the optical connector plug 10 is held in a second predetermined position.

More specifically, the front surface of the ferrule 14 inserted from the right side at first comes in contact with the front surface of the ferrule 14 inserted form the left side which is held in the first predetermined position, and then deflects the spring 216. When both of the front surfaces of the right and left ferrules 14 are positioned in the center plane C, i.e. the second predetermined position, the locking claws 208' are engaged with the locking notch 1612. Thus, even when connecting the optical connector plugs 10, 10 in each of which the ferrule is not axially movable with respect to the housing, it is possible to maintain a closely connected condition between ferrules 14, 14 and to prevent connection losses in optical connection from increasing, by utilizing the axial biassing force of the spring 216.

Denoted 230 is a split sleeve, which is optionally provided within the elastic sleeve 210', made of, for example, phosphor bronze or zirconia. The split sleeve 230 is used to enhance radial precession of the ferrules to be coupled.

Figure 8:
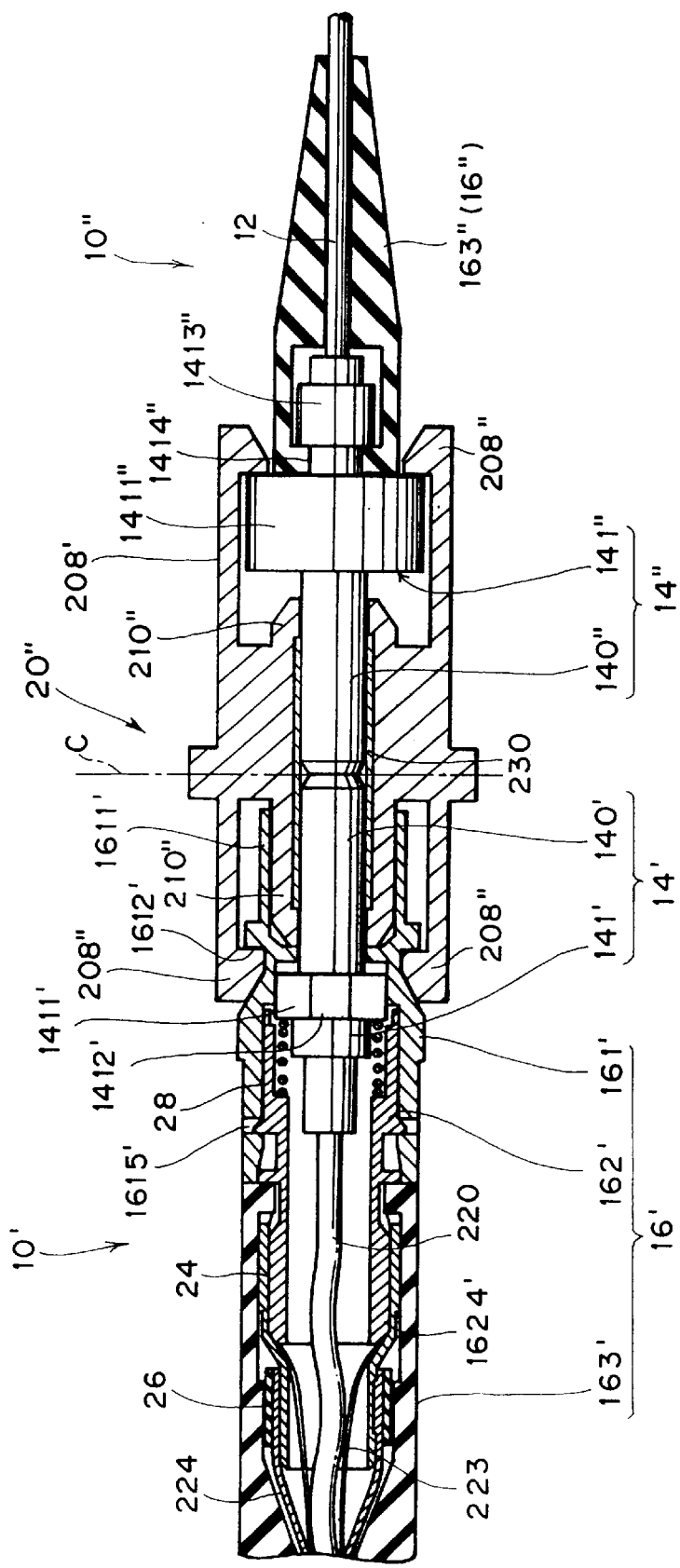
FIG. 8 is a cross sectional view showing an optical connector of the invention in still another coupled state.

Another embodiment of the invention will be described referring to FIG. 8.

An optical connector plug 10" according to this embodiment is intended to simplify its structure and to reduce costs by omitting the plug frame and the stop sleeve from the housing of the above mentioned embodiments. As a result, only a portion of a ferrule is accommodated within a housing.

A ferrule 14" of the optical connector plug 10" according to this embodiment in which the ferrule is immovable comprises an elongated cylindrical body 140" and a cap member 141", which is fitted to the body 140", forming a first flange 1411" with a large diameter at the middle portion of the ferrule 14" and a second flange 1413" with a small diameter at the rear portion of the ferrule 14". A relationship in connection between the ferrule body 140" and both the secondary coated optical fiber 120 and the optical cord jacket 123 of the optical fiber cord 12 is the same as that of the previous embodiment which is discussed referring to FIG. 5. Between the first flange 1411" and the second flange 1413" is formed an annular groove 1414". Then, the front end of a housing 16" consisting of a rubber hood 163" is engaged within the annular groove 1414" and adhesively bonded to the cap member 141" of the ferrule 14".

Figure 6:
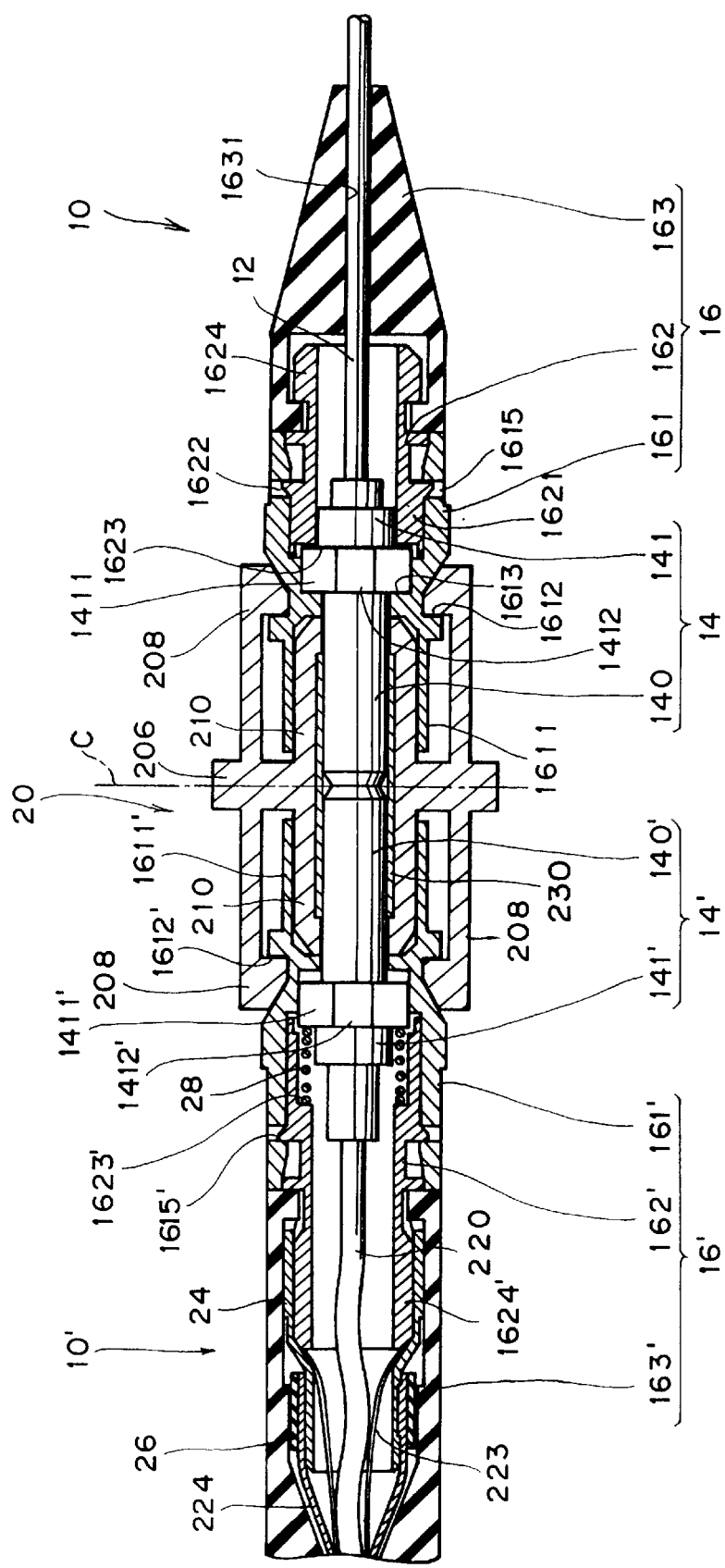
FIG. 6 is a cross sectional view showing an optical connector of the invention in another coupled state.

On the other hand, the structure of a connecting adapter 20' is basically the same as that of FIG. 6. However, since the optical connector plug 10" of this embodiment does not have a plug frame, an elastic sleeve 210" on the right side in FIG. 8 is formed shorter than that of FIG. 6. Because the remaining structure is the same as that to FIG. 6, members whose constructions are identical with those of the connecting adapter 20 set forth above are assigned like reference numerals but with double primes """ to simplify the discussion.

When the optical connector plug 10' having an axially movable ferrule is inserted from the left end of the connecting adapter 20", the front end of the ferrule 14' is inserted into the elastic sleeve 210" with the guide cylinder 1611' guided along the outer circumference of the elastic sleeve 210", and then the locking claws 208" engage with the locking notch 1612', resulting in the optical connector plug 10' is held in a predetermined position. At this time, associated parts are dimensioned such that the front surface of the ferrule 14' slightly projects from the center plane C of the connecting adapter 20" and positions in a first predetermined position by being biassed by the spring 28. Next, as the optical connector plug 10", is inserted from the right end of the connecting adapter 20", the front end of the ferrule 14" is inserted into the elastic sleeve 210", and then the locking claws 208" engage the shoulder portion of the first flange 1411" with a large diameter, resulting in the optical connector plug 10" is held in a predetermined position. At this time, the front surface of the ferrule 14" initially comes in contact with the front surface of the ferrule 14' which is held in the first predetermined position and then deflects the spring 28, resulting in the front surfaces of both the ferrules 14', 14" which are connected being positioned in the center plane C (second position) of the connecting adapter 20". Thus, it is possible to maintain a closely connected condition between ferrules 14' and 14" and prevent connection losses in optical connection from increasing by utilizing the axial biassing force of the spring 28.

On the other hand, in use with the optical connector plug having the immovable ferrule set forth above, it is preferable that the optical connector plug having the movable ferrule is disposed on an instrument and the optical connector plug having the movable ferrule, as the optical connector plug which is frequently connected and disconnected, connected to the instrument.

Further, a refractive index matching agent is coated on a connecting surface at the time of connection so as to exist between connecting surfaces of the optical connector plugs 10, 10' or 10". By this, it would be possible to reduce the increase of connection losses caused by a gap between the connecting surfaces of the optical connector plugs.

What is claimed is:

1. An optical connector plug comprising:
   an optical fiber cord having a secondary coated optical fiber and a tension-resistant jacket covering the secondary coated optical fiber;
   a ferrule fixed to an end of said optical fiber cord, the tension-resistant jacket of said optical fiber cord being secured to said ferrule; and
   a housing accommodating the ferrule, in such a manner that said ferrule is axially immovable but radially movable.

2. An optical connector plug according to claim 1, wherein said housing comprises a plug frame, a stop sleeve and an elastic hood.

3. An optical connector plug according to claim 2, wherein said tension-resistant jacket of said optical fiber cord is bonded to a rear end portion of said elastic hood of said housing.

4. An optical connector plug according to claim 1, wherein said housing is integrally formed with an adapter to which a mating optical connector plug to be connected is inserted.

5. An optical connector comprising:
   an optical connector plug comprising:
      an optical fiber cord having a secondary coated optical fiber and a tension-resistant jacket covering the secondary coated optical fiber;
      a ferrule fixed to an end of said optical fiber cord, the tension-resistant jacket of said optical fiber cord being secured to said ferrule; and
      a housing accommodating the ferrule, in such a manner that said ferrule is axially immovable but radially movable; and
   a connecting adapter which mutually connects a pair of said optical connector plugs.

6. An optical connector according to claim 5, wherein said connecting adapter comprises means for axially biassing said pair of optical connector plugs so as to connect to each other.

7. An optical connector plug comprising:
   a first optical connector plug comprising:
      an optical fiber cord having a secondary coated optical fiber and a tension-resistant jacket covering the secondary coated optical fiber;
      a ferrule fixed to an end of said optical fiber cord, the tension-resistant jacket of said optical fiber cord being secured to said ferrule; and
      a housing accommodating the ferrule, in such a manner that said ferrule is axially immovable but radially movable;

a second optical connector plug comprising:
   an optical fiber cord having a secondary coated optical fiber and a tension-resistant jacket covering the secondary coated optical fiber;
   a ferrule fixed to an end of said optical fiber, the tension-resistant jacket of said optical fiber cord being secured to said ferrule; and
   a housing accommodating the ferrule, in such a manner that said ferrule is axially movable; and a connecting adapter which mutually connects both said optical connector plugs.

8. An optical connector according to any one of claims 5, 6 or 7, wherein a refraction index matching agent is coated on a connecting surface of the optical connector plugs to be mutually connected.

\* \* \* \* \*